United States Patent
Gysling et al.

(10) Patent No.: US 6,898,541 B2
(45) Date of Patent: May 24, 2005

(54) METHOD AND APPARATUS FOR DETERMINING COMPONENT FLOW RATES FOR A MULTIPHASE FLOW

(75) Inventors: Daniel L. Gysling, Glastonbury, CT (US); Mark R. Myers, Storrs, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 111 days.

(21) Appl. No.: 09/996,626

(22) Filed: Nov. 28, 2001

(65) Prior Publication Data

US 2002/0123852 A1 Sep. 5, 2002

Related U.S. Application Data

(60) Provisional application No. 60/251,191, filed on Dec. 4, 2000.

(51) Int. Cl.$^7$ ............................................. G01F 25/00
(52) U.S. Cl. .................................................... 702/100
(58) Field of Search ............................ 702/100, 6, 48, 702/50; 73/736, 861, 1–83, 739, 862, 54.41, 1.44; 327/7; 166/332, 319; 385/12, 22; 356/478, 33; 703/2; 701/1; 364/508; 128/774

(56) References Cited

U.S. PATENT DOCUMENTS

| | | | | |
|---|---|---|---|---|
| 4,445,389 A | * | 5/1984 | Potzick et al. ........... | 73/861.27 |
| 5,415,024 A | * | 5/1995 | Proffitt et al. ............... | 73/61.44 |
| 5,453,944 A | * | 9/1995 | Baumoel ....................... | 703/2 |
| 5,604,301 A | * | 2/1997 | Mountford et al. ........ | 73/54.31 |
| 6,354,147 B1 | * | 3/2002 | Gysling et al. ............. | 73/61.79 |
| 2002/0152802 A1 | * | 10/2002 | Gysling et al. ............. | 73/61.79 |

FOREIGN PATENT DOCUMENTS

| WO | WO 00/19176 | 4/2000 | ................... 60/101 |
|---|---|---|---|

* cited by examiner

*Primary Examiner*—John Barlow
*Assistant Examiner*—Tung S Lau
(74) *Attorney, Agent, or Firm*—Moser, Patterson & Sheridan, L.L.P.

(57) ABSTRACT

An apparatus and corresponding method for determining component flow rates of a multiphase fluid in a conduit, the fluid consisting of at least three known components, the method including the steps of: measuring at each of two different positions along the conduit at least four mixture quantities, typically the sound speed, the flow velocity of the multiphase fluid, the pressure and the temperature; providing a speed of sound in each of the components at the measured pressures and temperatures; providing a trial value for each of either the component flow rates or the phase fractions; using a predetermined model to calculate values for the measured mixture quantities based on the trial values for each of either the component flow rates or the phase fractions; using a predetermined error function to determine an error value; and using a predetermined optimizing algorithm to determine whether the calculated values are acceptable, and, if they are not, to provide a new trial value for each of either the component flow rates or the phase fractions. In some applications, the error function is the sum of the squares of the difference between the measured and calculated values at each point.

6 Claims, 4 Drawing Sheets

METHOD AND APPARATUS FOR DETERMINING COMPONENT FLOW RATES FOR A MULTIPHASE FLOW

CROSS REFERENCE TO RELATED APPLICATION

Reference is made to and priority claimed from U.S. provisional application Ser. No. 60/251,191, filed Dec. 4, 2000, entitled METHOD AND APPARATUS FOR DETERMINING COMPONENT FLOW RATES For A MULTIPHASE FLOW.

FIELD OF THE INVENTION

The present invention concerns techniques for the measurement of the flow rate of each component of a multiphase fluid. More particularly, the present invention concerns techniques based on measurements at different locations along a conduit for determining the flow rates of each component of a multiphase fluid within the conduit.

BACKGROUND OF THE INVENTION

In extracting oil and gas from a formation, it is advantageous to monitor the flow rates of the different components of the production fluid, usually gas, oil and water. Such a three-component mixture presents a problem that is often more difficult to solve than that of determining the flow rates for binary mixtures. For a broad class of well mixed binary mixtures flowing in a conduit of known cross sectional area, for which the density and the sound speed of each component are known, measuring the sound speed of the mixture and the convection velocity of the mixture provides sufficient information to determine the flow rates of each of the components. The sound speed of the mixture is directly related to the phase fractions of each component in the mixture. More specifically, to determine the four unknowns, the phase fraction of each component and the flow rate of each component, four equations are used. One equation expresses that the sum of the component (phase) fractions is unity. Another is that the speed of sound in the mixture depends on the speed of sound and density of the individual components and the phase fraction of each constituent. Finally, there are two equations relating the flow velocities of the individual components to the overall mixture flow rate.

The approach of using a single sound speed measurement and a mixture flow rate measurement used in determining the component velocities in the case of a binary mixture, however, cannot be extended to solve the problem of finding the component velocities of a fluid with more than two components. Additional information is required beyond what is provided by a measurement of the speed of sound in the mixture and a measurement of the flow rate of the mixture.

To provide the required additional information, the prior art teaches multiphase flow meters that typically rely on several so called orthogonal measurement systems (said to be a orthogonal because each measurement system provides information that is at least partially independent of the information provided by the other measurement systems). Multiphase flow meters according to such an orthogonal system approach include meters based on multiple-energy nuclear sources, ultraviolet measurements, capacitance measurements, venturi effect measurements, and infrared measurements.

An alternative approach to determining the component flow velocities of a multiphase fluid in a conduit is to determine the additional required information from multiple point measurements, i.e. from measurements of the same information at different places along the conduit. For example, the speed of sound in the fluid, the flow rate of the fluid, and the pressure and temperature of the fluid would be made at two or more locations along the conduit. In addition, a multiphase flow model is used to relate the values of the parameters that are measured at one location to those measured at another location. These relationships can provide the additional constraints required to solve for additional parameters. Typically, the equations are nonlinear in several variables. Many methods can be employed to "solve" for the flow parameters of interest.

One class of methods defines an error function based on the -calculated values of the parameters compared to the measured values of the parameters. The flow-related parameters sought (i.e. the component velocities or component phase fractions) are adjusted -iteratively until the error is minimized. In this context, the flow parameters that result in minimizing the value of error function are assumed to be correct.

One company, previously Loke of Norway (now owned by FMC/KOS), is considered by many to have pioneered the general approach based on multiple point measurements for production allocation measurements in oil and gas production facilities. One implementation by Loke of the general approach is their software called Idun, which uses conventional pressure and temperature measurements along with a choke position measurement and knowledge of the fluid property characteristics to estimate the component flow rates (or phase fractions). The overall accuracy and robustness of the Idun approach is directly influenced by the type and quality of sensors available.

Another approach to determining component flow rates in a multiphase fluid based on making measurements at multiple locations along a conduit carrying the multiphase fluid is that based on a gradio-venturi system, which includes a venturi meter and employs a remote pressure sensor located several hundred feet above the venturi. The pressure difference between the pressure at the venturi and that at the remote transducer can be related to the flow rate and composition through a multiphase flow model, and can be used in conjunction with the pressure difference due to the flow thorough the venturi to estimate the component flow rates. Such an approach has several drawbacks. It requires a venturi, which is intrusive, and it has an accuracy limited in two-phase flow to ±10% of the total flow. Moreover, the accuracy degrades substantially in the presence of any significant entrained gas.

What is needed is a system of measuring the component velocities and phase fractions of a fluid that includes at least three components, and that is nonintrusive, sufficiently accurate, and that does not provide spurious solutions because of insufficient information.

SUMMARY OF THE INVENTION

Accordingly, the present invention provides an apparatus and corresponding method for determining component flow rates of a multiphase fluid in a conduit, the fluid consisting of at least three known components, the method including the steps of: measuring at each of two different positions along the conduit at least four mixture quantities; providing a speed of sound in each of the components at the measured pressures and temperatures; providing a trial value for each of either the component flow rates or the phase fractions; using a predetermined model to calculate values for the measured mixture quantities based on the trial values for each of either the component flow rates or the phase fractions; using a predetermined error function to determine an error value; and using a predetermined optimizing algorithm to determine whether the calculated values are acceptable, and, if they are not, to provide a new trial value for each of either the component flow rates or the phase fractions.

In a further aspect of the invention, the error function is the sum of the squares of the difference between the measured and calculated values at each point.

In another, further aspect of the invention, the four mixture quantities are the sound speed, the flow velocity of the multiphase fluid, the pressure and the temperature.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
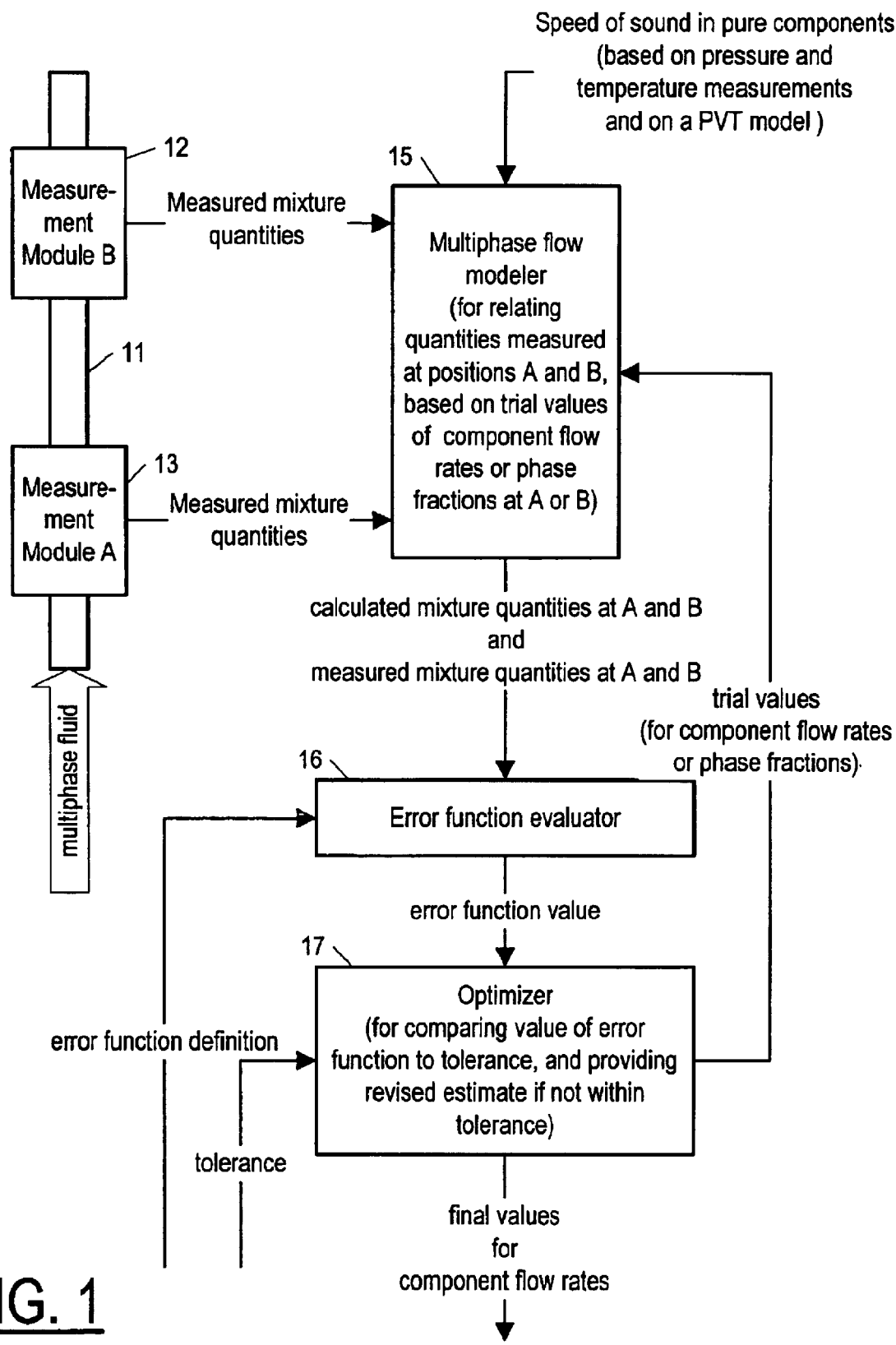
FIG. 1 is a schematic/block diagram of a system for measuring component flow velocities for a multiphase fluid in a conduit, according to the present invention.

The present invention for determining component flow rates (or, equivalently, phase fractions) for a multiphase fluid in a conduit is based on making measurements at different points along the conduit, as indicated in FIG. 1. The term flow rate is used here in reference to a point along a conduit to mean mass per unit time flowing past the point along the conduit. The flow rate at a point is related to the average flow velocity at the point by the cross sectional area of the conduit at the point. The term phase fraction of a component of a multiphase fluid in a conduit (at a point along the conduit) is used here to indicate the fraction of the total mass of a sample of the fluid (at the point along the conduit) that is due to the presence of the component. Knowing the flow rate of each component is equivalent to knowing the phase fractions and the mixture flow rate. The flow rate for a component, at a point along a conduit, is simply the product of the component flow velocity, the phase fraction for the component, and the total mass per unit length at the point along the conduit.

In the particular embodiment of a system according to the invention indicated in FIG. 1, four mixture quantities, namely the sound speed, the (mixture) flow velocity, the pressure and the temperature, are measured at two different positions along the conduit 11, at position A and at position B, using a measurement module 12 at A and a measurement module 13 at B, respectively. In the preferred embodiment, it is assumed that the flow can be modeled as time stationary so that measurements at the two positions at the same time are considered to be related. In other embodiments, however, the assumption that the flow is time stationary can be relaxed. In such embodiments, measurements at position B (downstream of position A) would be assumed to be related to measurements at position A only after a time interval depending on the flow velocity measured at position A, and possibly also at position B.

Still referring to FIG. 1, according to the invention values of the measured quantities are provided to a multiphase flow modeler 15, which also receives as input the speed of sound in each of the individual components. Such component speed of sound values are determined based on pressure and temperature measurements at positions A and B and on an assumed PVT model. The multiphase flow modeler 15 then relates the measurements at position B to the measurements at position A, according to the methodology described below, which involves using successive trial values of the component flow rates (or the phase fractions) and an error function that compares the measured mixture quantities with calculated mixture quantities based on the trial values, and iterating until the value of the error function is acceptably small. In the preferred embodiment of the invention, the system includes an error function evaluator 16 that computes, for each new trial value of the component quantities (component flow rates or phase fractions), each new corresponding value of the error function. An optimizer 17 then determines whether the calculated values are close enough to the measured values based on a predetermined tolerance, and if not, determines new trial values for the component quantities. The component rates (or the phase fractions) that minimize the error are ultimately provided by the optimizer 17 as the output of the system.

For an N-component mixture in a conduit, the component densities $\rho_i$, phase fractions $\phi_i$, and component sound speeds $c_i$ are related to the mixture sound speed $C_{mix}$ and mixture density $\rho_{mix}$ by the equations, $$\rho_{mix} = \sum_{i=1}^{N} \phi_i \rho_i, \qquad (1)$$

$$\frac{1}{\rho_{mix} c_{mix}^2} = \sum_{i=1}^{N} \frac{\phi_i}{\rho_i c_i^2}, \quad \text{and} \qquad (2)$$

$$\sum_{i=1}^{N} \phi_i = 1. \qquad (3)$$

For fluids in a flexible conduit, the propagation velocity of sound, or any other compressional wave, is influenced by the structural properties of the conduit. For a fluid in a conduit that is a vacuum-backed tube of radius R, thickness t and Young's modulus E, the measured mixture sound speed $c_{meas}$ is related to the infinite domain sound speed $c_{mix}$ and to the structural properties of the tube via the relation, $$\frac{1}{\rho_{mix} c_{meas}^2} = \frac{1}{\rho_{mix} c_{mix}^2} + \frac{2R}{Et}. \qquad (4)$$

However, as mentioned above, for a mixture of three or more components (called here a multi-component mixture, as opposed to a binary component mixture), the speed of sound no longer uniquely identifies the phase fractions of the different components. Additional information is required.

The above relations combine to provide a relation between measured sound speed $c_{meas}$, input fluid and structural properties represented by $$\sigma = \frac{2R}{Et},$$

and unknown phase fractions $\phi_i$ (where the index refers to one or another of the components), a relation that can be expressed in the form, $$\frac{1}{c_{mix,\alpha}^2} = \rho_{mix,\alpha} \left[ \sum_i^N \frac{\phi_{i\alpha}}{\rho_{i\alpha} c_{i\alpha}^2} + \sigma_\alpha \right] \quad (5)$$

where the index $\alpha$ refers to either position A or position B, and the index i refers to the different components of the fluid. Specializing the invention to a production fluid containing oil, gas, and water The invention will now be described in an embodiment that is particularly advantageous for determining the component flow rates (or, equivalently, the phase fractions) for a production fluid being pumped from a formation containing oil, gas, and water. It should however be understood that the invention has more general applicability; as will be clear, nothing about the invention restricts it to fluids of oil, gas, and water.

In the particular case of a three-phase (three-component) fluid consisting of gas, oil, and water, equation (5) becomes, $$\frac{1}{c_{mix,\alpha}^2} = \rho_{mix,\alpha} \left[ \frac{\phi_{g\alpha}}{\rho_{g\alpha} c_{g\alpha}^2} + \frac{\phi_{o\alpha}}{\rho_{o\alpha} c_{o\alpha}^2} + \frac{\phi_{w\alpha}}{\rho_{w\alpha} c_{w\alpha}^2} + \sigma_\alpha \right] \quad (6)$$

with $\phi_{g\alpha} + \phi_{o\alpha} + \phi_{w\alpha} = 1$, and where the index $\alpha$ refers to either position A or to position B along a conduit bearing the production fluid.

The invention imposes, as one condition, mass flow continuity of the individual phases, and uses a model for the evolution of gas from the oil. As the production fluid is pumped from position A up to position B, closer to the surface, gas escapes out of the oil/gas solution. The present invention uses a model that calculates the amount of gas at position B based on, among other factors, the amount of gas and oil at position A. Conceptually, the model tracks the multiphase flow as a four-component mixture, a mixture consisting of water, oil, gas present at position A, and gas evolved from the oil between position A and position B.
Application to well-mixed flow The invention will now be described in the particular case of well-mixed flow of a fluid consisting of oil, gas, and water. The extension to the general case, i.e. to the case of flow that is not well-mixed, will be apparent to one skilled in the art.

In the case of well-mixed flow, there is no slip among the individual phases, i.e. the mixture is homogeneous. In such a mixture, the condition of mass flow continuity from position A to position B becomes, $$\rho_{mix,A} A_A U_A = \rho_{mix,B} A_B U_B, \quad (7)$$

where $A_\alpha$ is the cross section of the conduit at the position indicated by the subscript $\alpha$, and $u_\alpha$ is the corresponding flow rate. In terms of the individual phases, assuming that the cross sections at position A and position B are equal, the condition of mass flow continuity expressed by equation (7) becomes, $$U_A(\phi_{oA}\rho_{oA} + \phi_{gA}\rho_{gA} + \phi_{wA}\rho_{wA}) = U_B(\phi_{oB}\rho_{oB} + \phi_{gB}\rho_{gB} + \phi_{wB}\rho_{wB}) \quad (8)$$

Conservation of the individual phases results in three equations, one equation for each of the three components.

For the oil and water components, the invention in the preferred embodiment assumes that the density of the water and oil components is the same at position A and position B, yielding, $$U_A \phi_{oA} \rho_{oA} = U_B \phi_{oB} \rho_{oB}, \quad (9)$$

and $$U_A \phi_{wA} \rho_{wA} = U_B \phi_{wB} \rho_{wB}, \quad (10)$$

These simplifying assumptions can be relaxed without altering the basis of the approach of the present invention.

The third equation derives from the conservation of the gas phase. The present invention models two mechanisms to account for the change in volumetric flow rate of the gas. First, it is assumed that the gas present at position A under goes an expansion characterized by its compressibility factor. Secondly, it is assumed that amount of gas that evolves from the fluid as it moves from position A to position B is proportional to the amount of oil present at position A. Expressing these relations in terms of volumetric flow rates at standard temperature and pressure (indicated by the subscript R)_yields the following relations, $$u_A \phi_{gA} A_A \frac{1}{Z_A} \frac{P_A}{P_R} \frac{T_R}{T_A} + \beta_R (P_B - P_A) \phi_{oA} u_A A_A = u_B \phi_{gB} A_B \frac{1}{Z_B} \frac{P_B}{P_R} \frac{T_R}{T_B} \quad (11)$$

where $\beta$ is the so-called gas evolution constant, which is defined as the amount of gas (in standard cubic feet) evolved from a barrel of oil as the pressure is lowered one pound per square inch (psi), and Z is the gas compressibility factor, defined as, $$Z \equiv \frac{VPT_R}{V_R P_R T}. \quad (12)$$

The gas evolution constant $\beta$ can be determined from a standard differential vaporization test in which the amount of dissolved gas (in standard cubic feet) per barrel of residual oil is reported as a function of pressure (see e.g. *PVT and Phase Behavior of Petroleum Reservoir Fluids*, by Ali Danesh, Elsevier, 1998). The gas compressibility factor Z is also reported in typical PVT field analyses of black oils.

The first term in equation (11) represents the amount of gas present at position A, and the second term represents the amount of gas evolved from the oil as the fluid moves from position A to position B.

The invention therefore constructs a system of seven equations. The sound speed mixing laws, given by equation (6), provide two equations. The phase conservation conditions, given by equations (9–11), provide three equations. These seven independent equations are in terms of six unknowns (the component flow rates or the phase fractions at both positions A and B) and so provide more than enough information to uniquely determine the six unknowns. Since the system of equations is over determined, instead of attempting to solve the system of equations (which may include inconsistent conditions), the invention seeks a solution that minimizes an error function. In the preferred embodiment, the invention uses as an error function a simple sum of the squares of the differences between the calculated values of a quantity measured at the two positions A and B and the measured values, i.e. using $F_i$ to represent a quantity that is measured at position A and position B, where the index i ranges over N such quantities, the invention uses as the error function, $$E = \sum_{i=1}^{N} |F_{calc,i} - F_{meas,i}|^2 \quad (13)$$

The application of this general approach can take many forms, i.e. many different algorithms or procedures may be used to minimize the error function E; how, specifically, the error function is minimized is not the subject of the present invention.

The accuracy of the general approach used in the present invention, that of minimizing an error function as explained above, depends on many factors, including: the fidelity of the parametric model; the quality, quantity and types of measurements; the accuracy of the calibration of the model input parameters; the accuracy of the well parameters, including for example the radius R, thickness t and Young's modulus E of the conduit; and the accuracy of the fluid parameters, including for example the component speeds of sound.

The inventors conducted several Monte Carlo simulations to evaluate the multiphase flow measurement approach developed above. The well parameters were selected to be representative of a producing black oil. The parameters used in the simulation are listed below.

TABLE 1

Parameters of components.

| Fluid | Density (kg/m^3) | sound speed (ft/sec) |
|---|---|---|
| oil | 700 | 3500 |
| water | 1000 | 5000 |
| gas | 1.2 * P/P$_{atm}$ | 1200 |

TABLE 2

Parameters of the mixture and conduit.
Component - independent parameters

| | |
|---|---|
| Pressure at A | 3000 psi |
| Pressure at B | 2800 psi |
| Temperature at A and B | 100 C. |
| β, gas evolution constant | 0.316 scf/stb/psi |
| Inner diameter of conduit | 3.0 inches |
| Wall thickness at A | 0.50 inches |
| Wall thickness at B | 0.25 inches |

Figure 2:
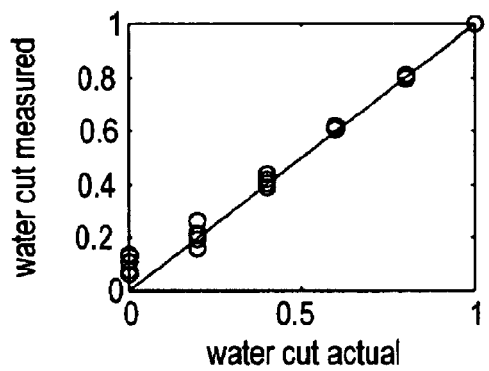
FIG. 2 is a set of plots showing the results of a simulation of use of the present invention in case of no free gas being present at an upstream position on a conduit.
Figure 2:
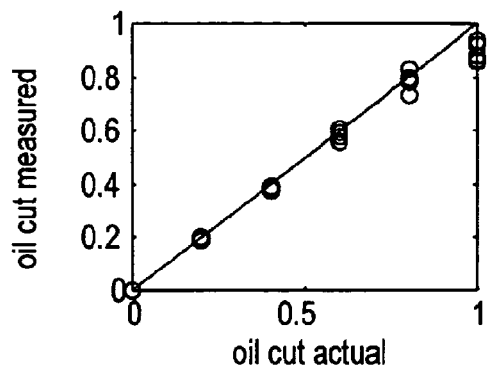
Figure 2:
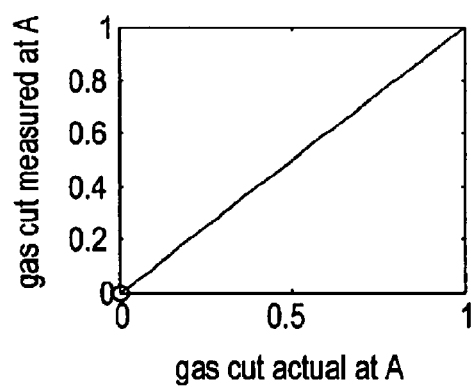
Figure 2:
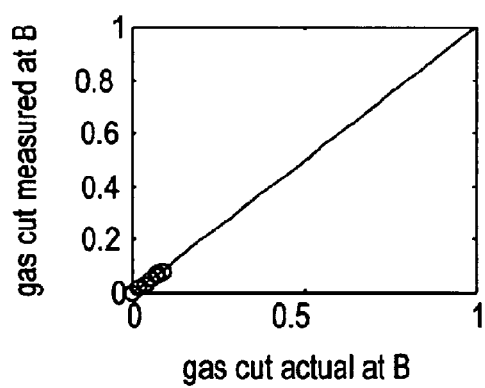
Figure 3:
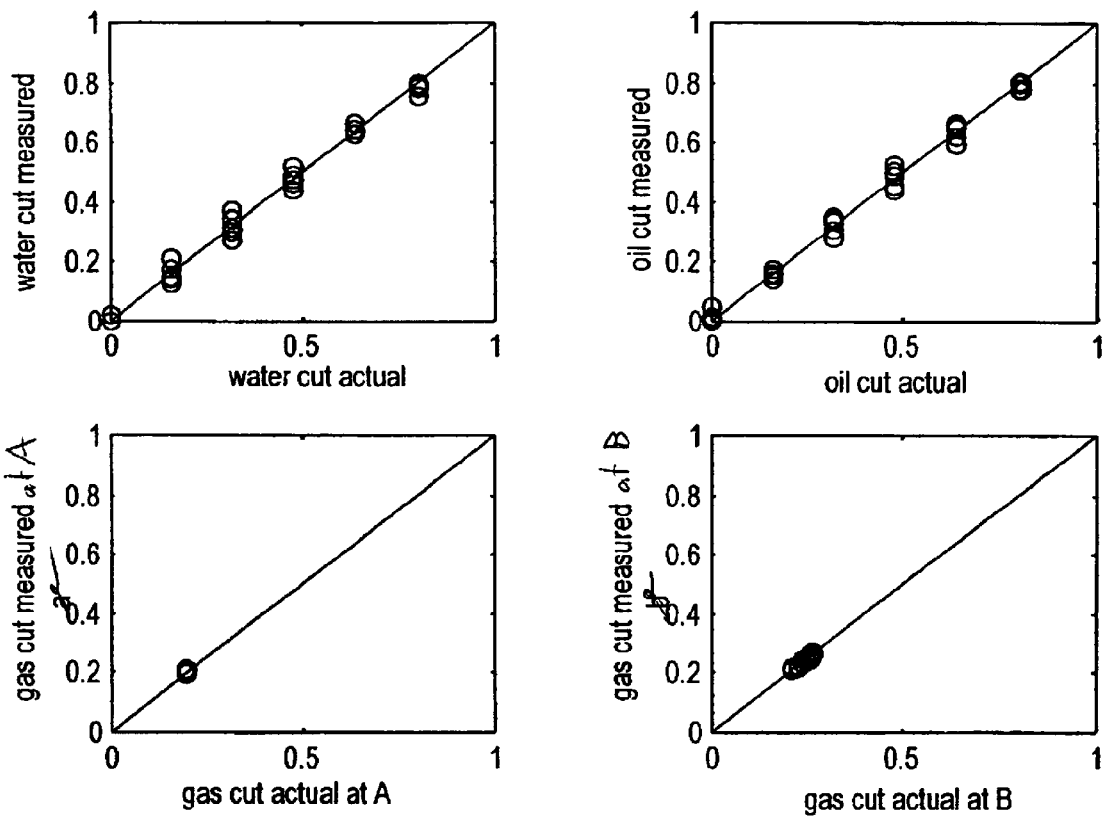
FIG. 3 is a set of plots showing the results of a simulation of use of the present invention in case of 20% (a phase fraction) free gas being present at an upstream position on a conduit.
Figure 4:
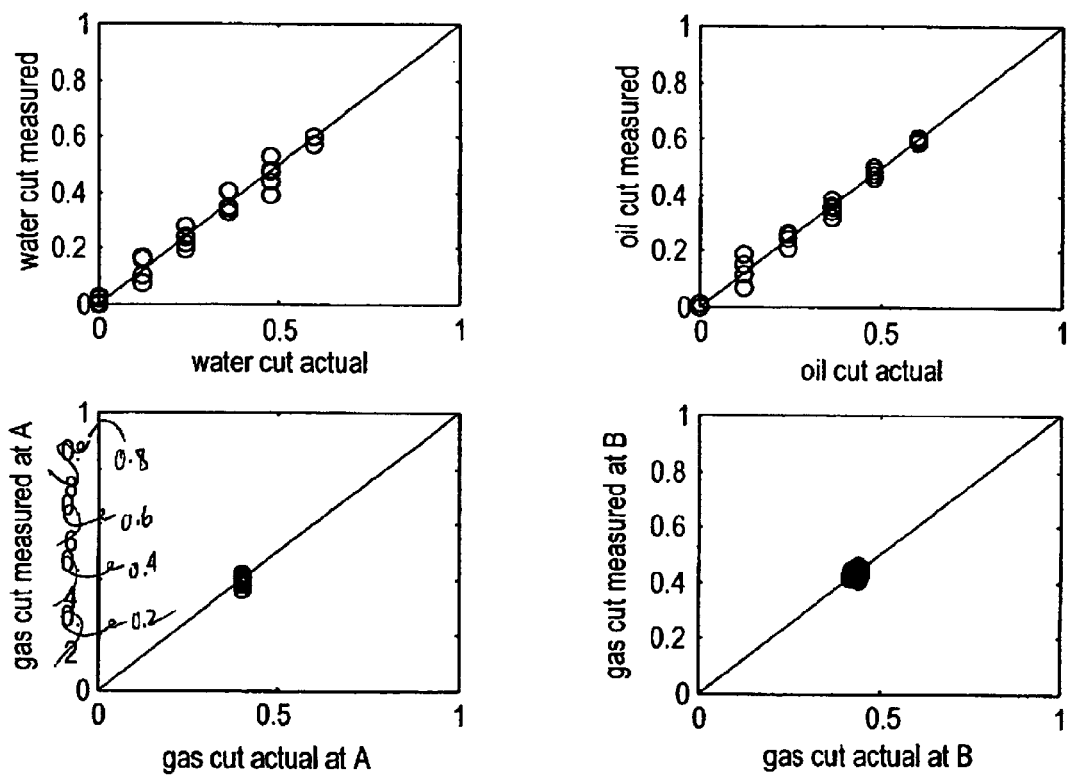
FIG. 4 is a set of plots showing the results of a simulation of use of the present invention in case of 40% free gas being present at an upstream position on a conduit.

FIGS. 2–4 present the results of the Monte Carlo simulations, in which the input parameters and measured parameters are varied in a random, but bounded, manner. The three figures illustrate the ability of the invention, even using the simplifying assumptions noted above, to measure the multiphase flow parameters as a function of oil and water cut for three levels of free gas present at position A (namely 0% for FIG. 2, 20% for FIG. 3, and 40% for FIG. 4) in the presence of the uncertainty for each of the parameters indicated in Table 3 below. The pressure was not directly varied in the simulations; the effect of any uncertainty in pressure is accounted for in the variations of the other model parameters.

TABLE 3

Uncertainty in model parameters.

| Parameter | Uncertainty |
|---|---|
| β, gas evolution constant | 2% |
| Oil sound speed | 2% |
| Gas sound speed | 1% |
| Water sound speed | 1% |
| Oil density | 1% |
| Gas density | 2% |
| Water density | 0.5% |
| Measured sound speed at A and B | 0.25% |
| Measured flow velocity at A and B | 0.25% |

For each of the simulations indicated in FIGS. 2–4, a single wall sub (measurement station) is assumed, with a thickness at position A of 0.5", and a thickness at position B of 0.25", as indicated in Table 2.

Discussion

The simulations indicate that the invention provides reasonable estimates of oil, gas, and water phase fractions, within ±10% of reference values for a reasonable level of uncertainty in both measured and input parameters for free gas volume fractions ranging from 0% at position A to 40% at position A.

The solution appears to be robust to uncertainty; gradually increasing the uncertainty in the input and measured parameters appears to translate into only a gradual degrading in flow measurement accuracy.

Scope of the Invention

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A method for determining component flow rates of a multiphase fluid in a conduit, the fluid consisting of at least three known components, the fluid having a pressure and temperature at each location of the fluid, the method comprising the steps of:
   a) measuring at each of two different positions along the conduit at least four mixture quantities;
   b) providing speed of sound values for each of the components at the pressures and temperatures at which the four different mixture quantities are measured;
   c) providing a trial value for each of either the component flow rates or phase fractions of the fluid;
   d) using a predetermined model to calculate values for the measured mixture quantities based on the speed of sound values and the trial values for each of either the component flow rates or the phase fractions;
   e) using a predetermined error function to determine an error value based on differences between the measured mixture quantities and the calculated values for the measured mixture quantities;
   f) determining whether the calculated values are acceptable based on the error value; and
   g) if the calculated values are not acceptable, using a predetermined optimizing algorithm to provide a new trial value for each of either the component flow rates or the phase fractions and repeating steps d through f.

2. A method as in claim 1, wherein the error function is the sum of the squares of the difference between the measured and calculated values at each point.

3. A method as in claim 1, wherein the four mixture quantities are the sound speed, the flow velocity of the multiphase fluid, the pressure and the temperature.

4. An apparatus for determining component flow rates of a multiphase fluid in a conduit, the fluid consisting of at least three known components, the fluid having a pressure and temperature at each location of the fluid, the apparatus comprising:

sensors for measuring at each of two different positions along tile conduit at least four mixture quantities;

a modeler for using a predetermined model to calculate values for the measured mixture quantities based on speed of sound values for each of the components at the pressures and temperatures at which the four different mixture quantities are measured and trial values for each of either the component flow rates or the phase fractions, the trial values and speed of sound values provided to the modeler;

an error function evaluator for using a predetermined error function to determine an error value value based an differences between the measured mixture quantities and the calculated values for the measured mixture quantities; and an optimizer for using a predetermined optimizing algorithm to determine whether the calculated values are acceptable based on the error value and, if the calculated values are not acceptable, provide a new trial value to the modeler for each of either the component flow rates or the phase fractions.

5. An apparatus as in claim 4, wherein the error function is the sum of the squares of the difference between the measured and calculated values at each point.

6. An apparatus as in claim 4, wherein the four mixture quantities are the sound speed, the flow velocity of the multiphase fluid, the pressure and the temperature.

* * * * *